US012737241B2

(12) United States Patent
Andrews et al.

(10) Patent No.: US 12,737,241 B2
(45) Date of Patent: Sep. 15, 2026

(54) PROCESS POOLING FOR APPLICATION SERVICES

(71) Applicant: Microsoft Technology Licensing, LLC, Redmond, WA (US)

(72) Inventors: Emily Katherine Andrews, Celina, TX (US); Michael J. Ens, Redmond, WA (US); Andrew J. Ritz, Sammamish, WA (US); Javier N. Flores Assad, Bothell, WA (US); Stefan F. Smolen, Bellevue, WA (US); Clifford M. Smolinsky, Snoqualmie, WA (US); Matthew E. Porter, Seattle, WA (US); Johnathan Norman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 709 days.

(21) Appl. No.: 18/142,922

(22) Filed: May 3, 2023

(65) Prior Publication Data

US 2024/0370315 A1 Nov. 7, 2024

(51) Int. Cl.
*G06F 9/54* (2006.01)

(52) U.S. Cl.
CPC .................................... *G06F 9/542* (2013.01)

(58) Field of Classification Search
CPC ....... G06F 9/5005; G06F 9/5055; G06F 9/546
See application file for complete search history.

(56) References Cited

U.S. PATENT DOCUMENTS

| | | | | |
|---|---|---|---|---|
| 10,181,045 | B1 * | 1/2019 | Ashminov | G06F 21/6209 |
| 10,824,474 | B1 * | 11/2020 | Kamboj | G06F 9/5038 |
| 11,811,885 | B2 * | 11/2023 | Shankar | H04L 67/51 |
| 2019/0188034 | A1 | 6/2019 | Lloyd | |

OTHER PUBLICATIONS

International Preliminary Report on Patentability (Chapter I) received for PCT Application No. PCT/US2024/025095, mailed on Nov. 13, 2025, 08 Pages.

“Intro to Mojo & Services”, Retrieved From: https://chromium.googlesource.com/chromium/src/+/refs/heads/main/docs/mojo_and_services.md#fsending-a-message, Retrieved on: Jan. 11, 2023, 12 Pages.

“Sandbox”, Retrieved From: https://chromium.googlesource.com/chromium/src/+/refs/heads/main/docs/design/sandbox.md, Retrieved on: Jan. 11, 2023, 13 Pages.

(Continued)

*Primary Examiner* — Andy Ho
(74) *Attorney, Agent, or Firm* — Klarquist Sparkman, LLP

(57) ABSTRACT

Aspects of the present disclosure relate to process pooling for application services. In examples, a pool of utility processes is maintained, such that a preexisting utility process is identified from the process pool based on a set of criteria and used to host a service accordingly (e.g., in response to a service request from an application or other software). In instances where the process pool does not include a utility process that matches the set of criteria, a new utility process may be created and used to host the service. Further, the new utility process may be added to the process pool, such that a future service having the same or a similar associated set of criteria may be hosted using the new utility process accordingly.

18 Claims, 6 Drawing Sheets

(56) References Cited

OTHER PUBLICATIONS

"Service Development Guidelines", Retrieved From: https://chromium.googlesource.com/chromium/src/+/refs/heads/main/services/README.md, Retrieved on: Jan. 11, 2023, 5 Pages.
"Servicifying Chromium Features", Retrieved From: https://chromium.googlesource.com/chromium/src/+/refs/heads/main/docs/servicification.md, Retrieved on: Jan. 11, 2023, 6 Pages.
"Sharing Sandbox Policy Between Processes", Retrieved From: https://docs.google.com/document/d/1bsC5LIw_GLuYhxYhRxqhcwlXDFEuYwzswbTAZ0qj0vM/edit#heading=h.g9aa775zjc37, Jun. 2022, 6 Pages.
Abd-El-Malek, John, "Chrome Service Model", Retrieved From: https://docs.google.com/document/d/15I7sQyQo6zsqXVNAIVd520tdGaS8FCicZHrN0yRu-oU/edit#heading=h.cfuqado3j561, Feb. 2016, 10 Pages.
International Search Report and Written Opinion received for PCT Application No. PCT/US2024/025095, Aug. 1, 2024, 11 pages.

* cited by examiner

PROCESS POOLING FOR APPLICATION SERVICES

BACKGROUND

Executing a process by a computing device consumes computing resources of the computing device, including, but not limited to, memory and processing time. Further, at least a part of such resource utilization may be overhead, such that using multiple processes to perform similar processing ultimately results in a corresponding increase in resource overhead that is attributable to each additional process. As a result, using multiple processes may yield an increase in resource utilization, even though the processing task is similar to an example in which fewer processes are used. Accordingly, managing how processes are used to perform various tasks may affect resource utilization and/or system stability, among other examples.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to process pooling for application services. In examples, a pool of utility processes is maintained, such that a preexisting utility process is identified from the process pool based on a set of criteria and used to host a service accordingly (e.g., in response to a service request from an application or other software). In instances where the process pool does not include a utility process that matches the set of criteria, a new utility process may be created and used to host the service. Further, the new utility process may be added to the process pool, such that a future service having the same or a similar associated set of criteria may be hosted using the new utility process accordingly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
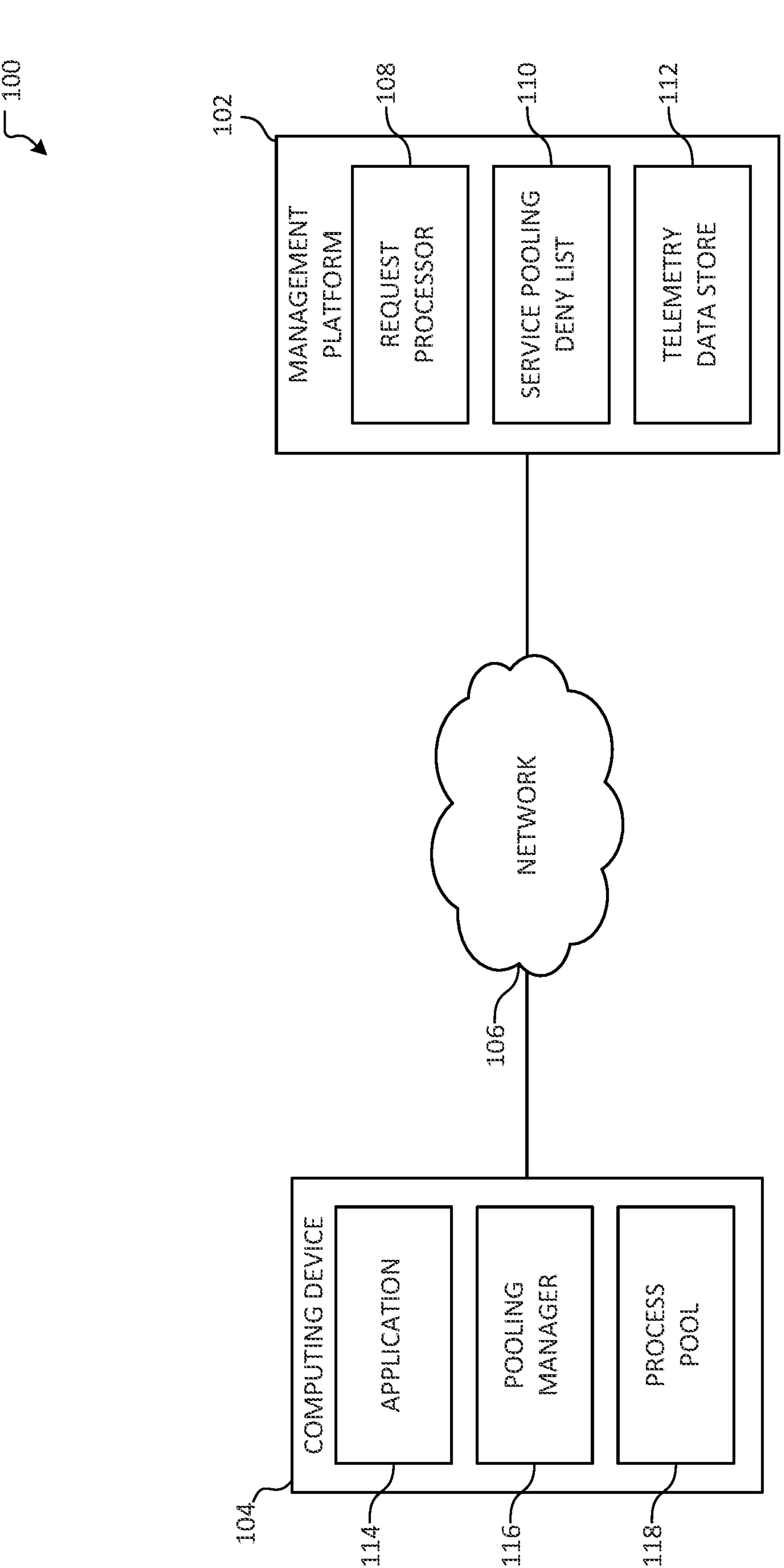
FIG. 1 illustrates an overview of an example system for process pooling according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, an application uses one or more services to perform processing associated with the application. A service may provide any of a variety of functionality, including, but not limited to, search indexing, entity extraction, networking operations, storage operations, image/video encoding and/or decoding, data compression and/or decompression, malware scanning, document rendering, programmatic language interpretation, and/or cross-device synchronization, among other examples. In some instances, such services are provided by one or more utility processes that are separate from a process of the application (also referred to herein as a main process), thereby increasing reliability, privacy, and/or security of the application.

However, grouping all such services into a single utility process may reduce or negate potential reliability and/or security benefits. Conversely, while using multiple utility processes for a subset of services, or even a single utility process for each service, may increase reliability and/or security, each additional process introduces corresponding overhead, which may have a detrimental effect on the available computing resources of the computing device. For example, each utility process may load a shared library (e.g., corresponding to a set of services used by an application), thereby resulting in multiple copies of the shared library being stored in memory. However, given each utility process may provide only a subset of the available services, each utility process may not use the full extent of the shared library, thereby resulting in potentially unnecessary overhead. Thus, it may be challenging to balance the reliability and/or security benefits of using multiple processes to provide services for an application with the additional resource utilization that results from each additional process.

Accordingly, aspects of the present disclosure relate to process pooling for application services. In examples, a pool of utility processes is maintained, such that a preexisting utility process is identified from the process pool based on a set of criteria and used to host a service accordingly (e.g., in response to a service request from an application or other software). In instances where the process pool does not include a utility process that matches the set of criteria, a new utility process may be created and used to host the service. Further, the new utility process may be added to the process pool, such that a future service having the same or a similar associated set of criteria may be hosted using the new utility process accordingly.

Thus, the disclosed aspects enable the identification of a matching utility process for hosting a service, if available, and, if not, the creation of a new utility process that can be used for hosting the service and one or more additional services in the future. As such, all services need not be hosted by a single utility process, nor need they each be hosted by a respective utility process. Rather, the disclosed aspects balance reliability, security, and/or resource utilization, among other examples.

Example criteria with which a utility process may be identified include, but are not limited to, security criteria (e.g., a corresponding sandbox and/or a set of entitlements), privacy criteria (e.g., whether processing corresponds to sensitive data, user permissions, and/or file permissions), reliability criteria (e.g., a performance guarantee and/or whether processing is tolerant of crashes or other processing interruptions), or any combination thereof, among other examples. Thus, it will be appreciated that services may be grouped together (e.g., to be hosted by the same utility process) according to aspects described herein based on any of a variety of criteria.

In examples, exact matching is used to determine whether an existing utility process is available for a set of criteria associated with a service request. In other examples, partial or inexact matching is used. For example, if a utility process is available that has more stringent performance guarantees than are indicated by the set of criteria and the utility process otherwise matches the set of criteria, the utility process may be used to host a service accordingly.

In some examples, one or more such criteria and/or an associated matching technique is user customizable. As an example, a user indicates that privacy is a priority, such that more stringent criteria and/or matching is used (which may result in a greater number of utility processes). As another example, the user indicates that processing performance is a priority (rather than reduced memory utilization), such that an increased number of utility processes is similarly prioritized, thereby potentially enabling greater parallelization as compared to instances where a smaller number of utility process are each responsible for more services. Similarly, different criteria may be used for first-party software as compared to third-party software, as the first-party software may be comparatively more trustworthy such that a greater degree of pooling is permitted as compared to third-party software.

In examples, a new utility process is created even in instances where a matching utility process is available. For example, one or more resource thresholds (e.g., relating to memory utilization, processor utilization, and/or utilization of a messaging bus/channel) may be used, such that a utility process is not permitted to exceed the threshold(s). As another example, a utility process is limited to permit only a predetermined number of services to be hosted by the utility process, after which a new utility process is used. As a further example, the utility process may perform processing of sensitive data, such that no other services are permitted to be hosted by the utility process.

In some examples, a deny list is maintained, such that services on the deny list are not permitted to be grouped with other services. For instance, a service may be dynamically added to the deny list as a result of determining the service has a security issue or exhibits instability, thereby reducing the likelihood that such issues will affect other services. As another example, certain services may not be grouped with other services to reduce an associated attack surface. For instance, a networking and/or storage service may each be exclusively hosted by corresponding utility processes to reduce the likelihood that another service having a security vulnerability is grouped with the networking/storage services, which could inadvertently permit access to the networking/storage service via a service exploit.

It may be determined to transition from a first utility process to a second utility process, such that new service requests are handled by the second utility process accordingly. Further, new workloads may be directed to a service of the second utility process rather than to a similar service of the first utility process, such that the first utility process may ultimately conclude processing and may thus terminate. Such aspects may be used to periodically rotate to a new utility process as a mitigation for memory leaks and/or other potential runtime issues. In another example, a computing device may initially use a comparatively high number of utility processes, and a similar technique may be used to transition services from multiple utility processes to a reduced number of utility processes, for example in response to determining to reduce resource utilization of the computing device.

FIG. 1 illustrates an overview of an example system 100 for process pooling according to aspects described herein. As illustrated, system 100 includes management platform 102, computing device 104, and network 106. In examples, management platform 102 and computing device 104 communicate via network 106, which may comprise a local area network, a wireless network, or the Internet, or any combination thereof, among other examples.

As illustrated, management platform 102 includes request processor 108, service pooling deny list 110, and telemetry data store 112. In examples, request processor 108 receives a request for an updated deny list from computing device 104 (e.g., as may be generated by pooling manager 116). Accordingly, request processor 108 provides a response that includes an indication of one or more services that are not permitted to be grouped with other services. As noted above, the deny list may restrict one or more services to being hosted within their own utility process. Additionally, or alternatively, the deny list indicates a given service that exhibits a compatibility issue with one or more other services, such that the service is still a candidate for pooling with services other than the indicated services. Thus, it will be appreciated that a deny list need not fully inhibit pooling and may, in some examples, partially restrict pooling instead.

In examples, request processor 108 receives telemetry data from pooling manager 116, which may be stored in telemetry data store 112. For example, the telemetry data indicates stability for one or more services, such that it may be determined whether a service should be added to or removed from service pooling deny list 110. Additionally, or alternatively, telemetry data from telemetry data store 112 is used to update criteria with which services are assigned to utility processes according to aspects described herein.

System 100 is further illustrated as comprising computing device 104. Computing device 104 may be any of a variety of computing devices, including, but not limited to, a mobile computing device, a tablet computing device, a laptop computing device, or a desktop computing device, among other examples. As illustrated, computing device 104 includes application 114, pooling manager 116, and process pool 118.

Application 114 may be any of a variety of applications, including, but not limited to, a web browser application, a video conferencing application, an instant messaging application, or a word processing application, among other examples. As another example, application 114 includes a framework that enables internet content to be embedded within application 114, such that at least a part of the functionality of application 114 is provided via the web framework. While examples are discussed with respect to application 114, it will be appreciated that the disclosed aspects may similarly be applied to any of a variety of other software. For instance, the disclosed aspects may be used for process pooling by an operating system, among other examples.

Computing device 104 further includes pooling manager 116. In examples, pooling manager 116 communicates with management platform 102 to obtain a deny list and/or to provide telemetry data, as was discussed above. When application 114 invokes functionality associated with a service (e.g., through a service request), pooling manager 116 determines a set of criteria with which process pool 118 is to be evaluated. As an example, the service request includes an application programming interface (API) call to an API associated with the requested service.

The set of criteria may be determined based on the application and/or content that is to be processed by the service, among other examples. For example, if application 114 is a web browser application, the set of criteria may be determined based at least in part on a website that application 114 is being used to access. Additionally, or alternatively, at least a part of the criteria is specified by a website, by a developer of application 114, and/or based on a user preference, among other examples.

As noted above, pooling manager 116 may use exact or inexact matching to determine whether process pool 118 includes a utility process with which to host the requested service. In examples, pooling manager 116 maintains a map between a utility process descriptor and a utility process of process pool 118, such that pooling manager 116 evaluates the map based on the determined set of criteria accordingly. The utility process descriptor describes one or more attributes for a given utility process, including, but not limited to, a corresponding sandbox, one or more entitlements, a performance guarantee, and/or a security level, among other examples. It will be appreciated that such attributes may correspond to the criteria according to aspects described herein, such that attributes of preexisting utility processes are evaluated based on corresponding criteria accordingly.

If pooling manager 116 determines a matching utility process is available from process pool 118, pooling manager 116 assigns the service to the matching utility process, such that the matching utility process hosts the requested service accordingly. In examples, pooling manager 116 provides an indication of an inter-process communication (IPC) channel associated with the matching utility process to application 114, such that processing for the service is performed via the IPC channel accordingly.

However, if pooling manager 116 instead determines that a matching process is not available (e.g., there is not a utility process that matches the set of criteria or a matching process is unavailable for one or more other reasons according to aspects described herein), pooling manager 116 creates a new utility process based on the set of criteria associated with the service request. In examples, the new utility process is added to process pool 118, for example by adding an entry in a map that associates a utility process descriptor with the utility process, thereby enabling subsequent identification of the utility process accordingly.

While system 100 is provided as an example of process pooling at computing device 104, it will be appreciated that similar aspects may be used for a server device or in a distributed context, for example for service assignment across multiple devices according to a set of criteria and corresponding attributes according to aspects described herein.

Figure 2:
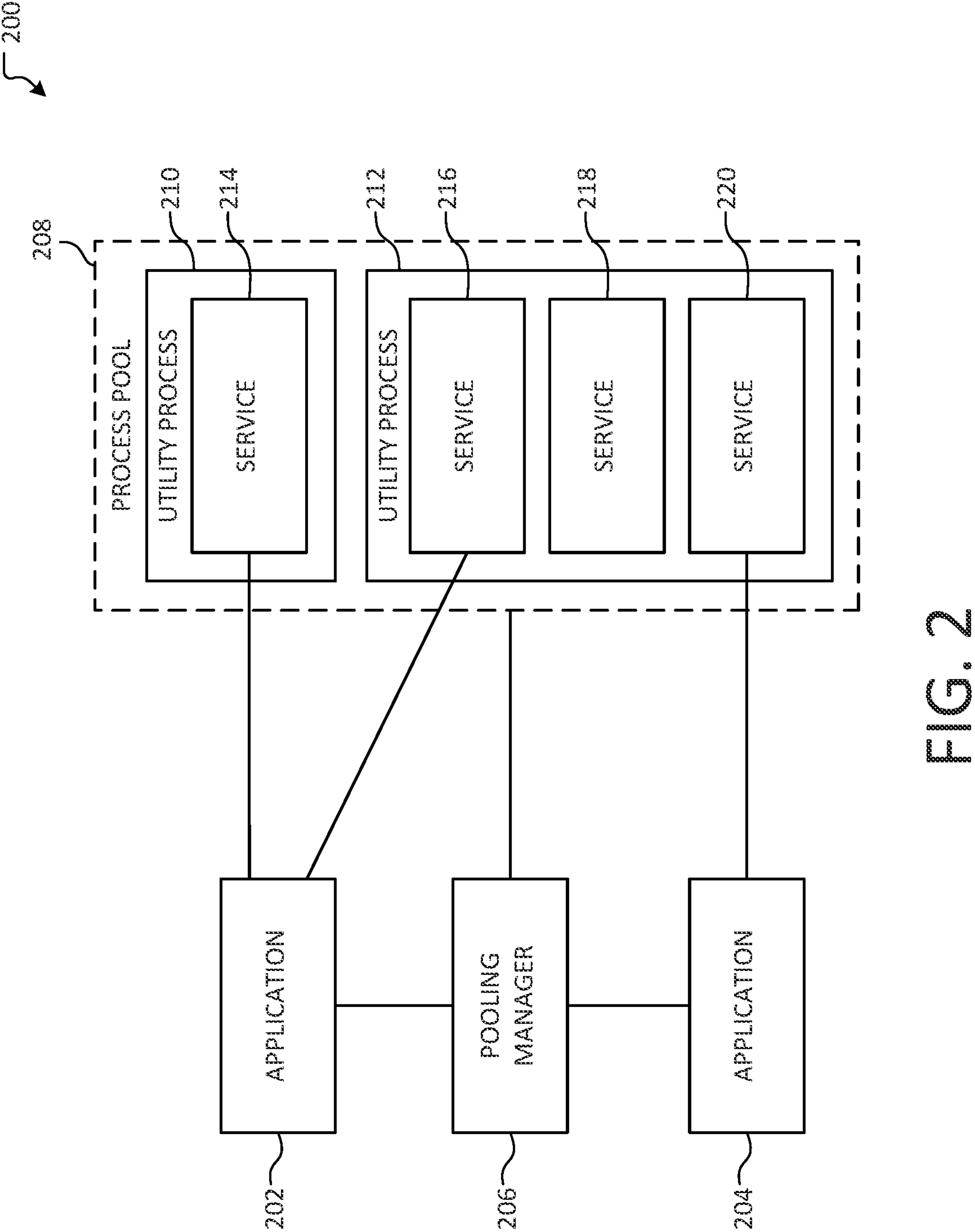
FIG. 2 illustrates an overview of an example conceptual diagram of a process pool for providing services to a set of applications according to aspects described herein.

FIG. 2 illustrates an overview of an example conceptual diagram 200 of a process pool for providing services to a set of applications according to aspects described herein. As illustrated, conceptual diagram 200 includes application 202, application 204, pooling manager 206, and process pool 208. Aspects of application 202 and application 204 may be similar to application 114 discussed above with respect to FIG. 1 and are therefore not necessarily redescribed below in detail. Further, aspects of pooling manager 206 and process pool 208 may be similar to pooling manager 116 and process pool 118, respectively, such that they are not necessarily redescribed below in detail.

In an example, application 202 makes a service request, such that pooling manager 206 determines whether process pool 208 includes a utility process with which to host the requested service. For example, pooling manager 206 may determine utility process 212 is available (e.g., as may have already been hosting service 218) to host the service, such that service 216 is hosted by utility process 212 for use by application 202 accordingly.

As another example, pooling manager 206 determines (e.g., as an alternative to the above-discussed determination or based on a different service request) that a preexisting utility process is not available, as may be the case if process pool 208 does not include a utility process having attributes that satisfy an associated set of criteria or if a preexisting utility process (e.g., utility process 212) has exceeded a resource limit, among other examples. As a result, pooling manager 206 creates a new utility process (e.g., utility process 210) within process pool 208, such that the requested service (e.g., service 214) is hosted by the new utility process accordingly.

Similarly, pooling manager 206 processes a service request of application 204 to determine whether process pool 208 includes a utility process with which to host the requested service. As illustrated, utility process 212 may have been identified from process pool 208, such that service 220 is hosted by utility process 212 accordingly. As noted above, application 202 and application 204 may communicate with services 214, 216 and service 220, respectively, via an IPC channel or a message bus, among other examples.

As a result, application 202 and application 204 use services 216 and 220, respectively, which are both hosted by utility process 212, for example as a result of application 202 and 204 having similar security criteria, privacy criteria, and/or reliability criteria that matches one or more attributes of utility process 212. Thus, rather than each service being hosted separately, which may introduce additional computational overhead, services 216 and 220 are grouped within utility process 212 by pooling manager 206 according to aspects described herein.

Conceptual diagram 200 further illustrates an instance where application 202 also uses service 214, which is instead hosted by utility process 210 (rather than utility process 212, as was used for service 216). As an example, service 214 may process comparatively more sensitive data than service 216, such that it cannot be grouped with service 220. As another example, service 214 may be on a deny list (e.g., service pooling deny list 110 in FIG. 1), as may be the case when service 214 is unstable or has a security vulnerability. As a further example, utility process 212 may be limited to hosting three services (e.g., service 216, 218, and 220), such that pooling manager 206 creates a new utility process (e.g., utility process 210) according to aspects described herein. It will therefore be appreciated that pooling manager 206 may determine to group or to separate services for any of a variety of reasons according to aspects described herein.

While FIG. 2 is illustrated as including two applications, it will be appreciated that similar techniques may be used for a single application that processes different content. For example, different websites may similarly be processed by a web browser application, such that a first website is associated with services 214 and 216, while a second website is associated with service 220, which may similarly improve isolation between different websites according to aspects described herein.

Figure 3:
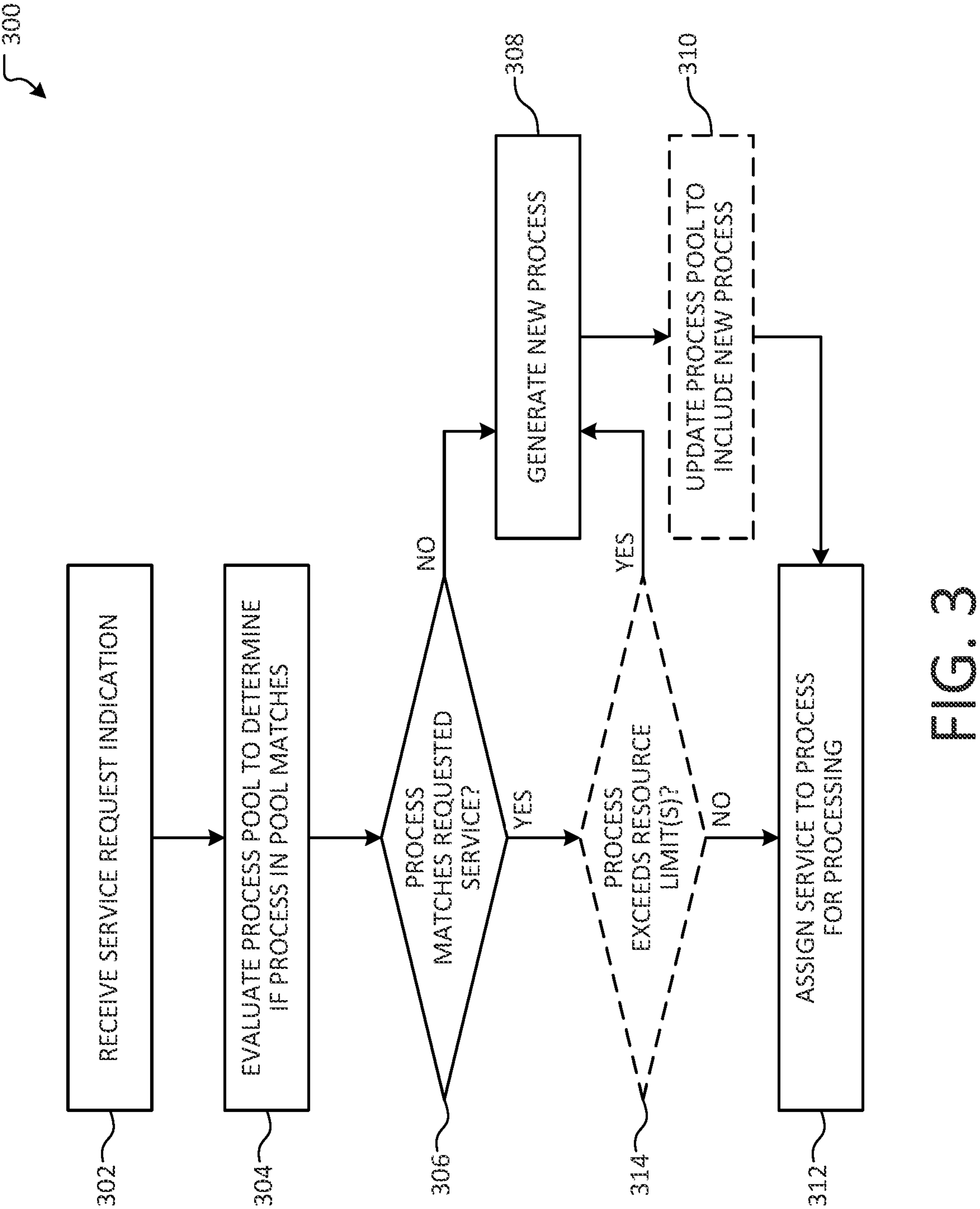
FIG. 3 illustrates an overview of an example method for process pooling according to aspects described herein.

FIG. 3 illustrates an overview of an example method 300 for process pooling according to aspects described herein. In examples, aspects of method 300 are performed by a pooling manager, such as pooling manager 116 or pooling manager 206 in FIGS. 1 and 2, respectively.

As illustrated, method 300 begins at operation 302, where a service request indication is received. For example, an application (e.g., application 114) calls a function of an API to request functionality of a service associated therewith. As noted above, the function may be provided by a shared library, such that a utility process loads the shared library and provides the requested functionality accordingly. While illustrative examples of a service request are described, it will be appreciated that any of a variety of other requests and/or function calls by an application may similarly be processed according to aspects of the present disclosure.

Flow progresses to operation 304, where a process pool (e.g., process pool 118 or process pool 208 in FIGS. 1 and 2, respectively) is evaluated to determine whether an existing utility process matches the service request. In examples, operation 304 comprises generating or otherwise determining a set of criteria for the service request. As noted above, the set of criteria may be determined based at least in part on the application and/or content that is processed by the application, among other examples. For example, the security criteria is determined based on a sandbox for the application and/or based on a website being accessed by the application, among other examples. As another example, at least a part of the set of criteria may be determined based on a user preference.

The process pool is evaluated based on the set of criteria to determine whether any of the utility processes match the set of criteria. In examples, a process pool map is used, which includes utility process descriptors that each correspond to a utility process of the process pool. Accordingly, it may be determined whether any utility process descriptors match the set of criteria, such that a utility process associated with a matching utility process descriptor may be used to host the requested service accordingly. Exact or inexact matching may be used. For example, an inexact match may be identified when an existing utility process has one or more attributes that exceed one or more criteria associated with the service request (e.g., as being more secure, more reliable, and/or having a higher performance guarantee).

Moving to determination 306, it is determined, based on the processing that was performed at operation 304, whether a process from the process pool matches the set of criteria. If it is determined that there is not a matching process, flow branches "NO" to operation 308, where a new process is generated. In examples, operation 308 comprises launching a new process that includes a shared library that corresponds to the requested service. The new process may be created to have one or more attributes that correspond to the set of criteria that was determined at operation 304, for example having an associated sandbox, set of entitlements, and/or performance guarantee, among other examples.

Accordingly, at operation 310, the new process may be added to the process pool, thereby enabling a subsequent service request having the same or a similar set of criteria to be hosted using the new process accordingly. Operation 310 is illustrated using a dashed box to indicate that, in some examples, operation 310 may be omitted. For example, operation 310 may be omitted if the service request corresponds to a sensitive service and/or data processing, if the new process has reached one or more resource limits, and/or if the service is on a deny list, among other examples.

Flow progresses to operation 312, where the requested service is assigned to the process for subsequent processing. In examples, operation 312 comprises opening an IPC channel between the process and the application that generated the service request. Thus, operation 312 facilitates communication between the application and the process, such that the process hosts the service for the application accordingly. Method 300 terminates at operation 312.

Returning to determination 306, if it is instead determined that a utility process of the process pool matches the service request, flow branches "YES" to determination 314, where it is determined whether the preexisting utility process in the process pool exceeds one or more resource limits. As noted above, there may be instances where a preexisting utility process that could host a service may not be used, such as when the utility process has exceeded a resource limit (e.g., memory utilization, processor utilization, and/or a number of hosted services). Determination 314 is provided as an example of such an instance, though it will be appreciated that additional or alternative determinations may be used in other examples.

If it is determined that the identified utility process has exceeded one or more resource limits, flow branches "YES" to operation 308, where a new utility process is generated as discussed above. By contrast, if it is instead determined the identified utility process has not exceeded one or more resource limits, flow branches "NO" to operation 312, where the preexisting process that was identified from the process pool is used to host the process accordingly. As noted above, method 300 terminates at operation 312.

Figure 4:
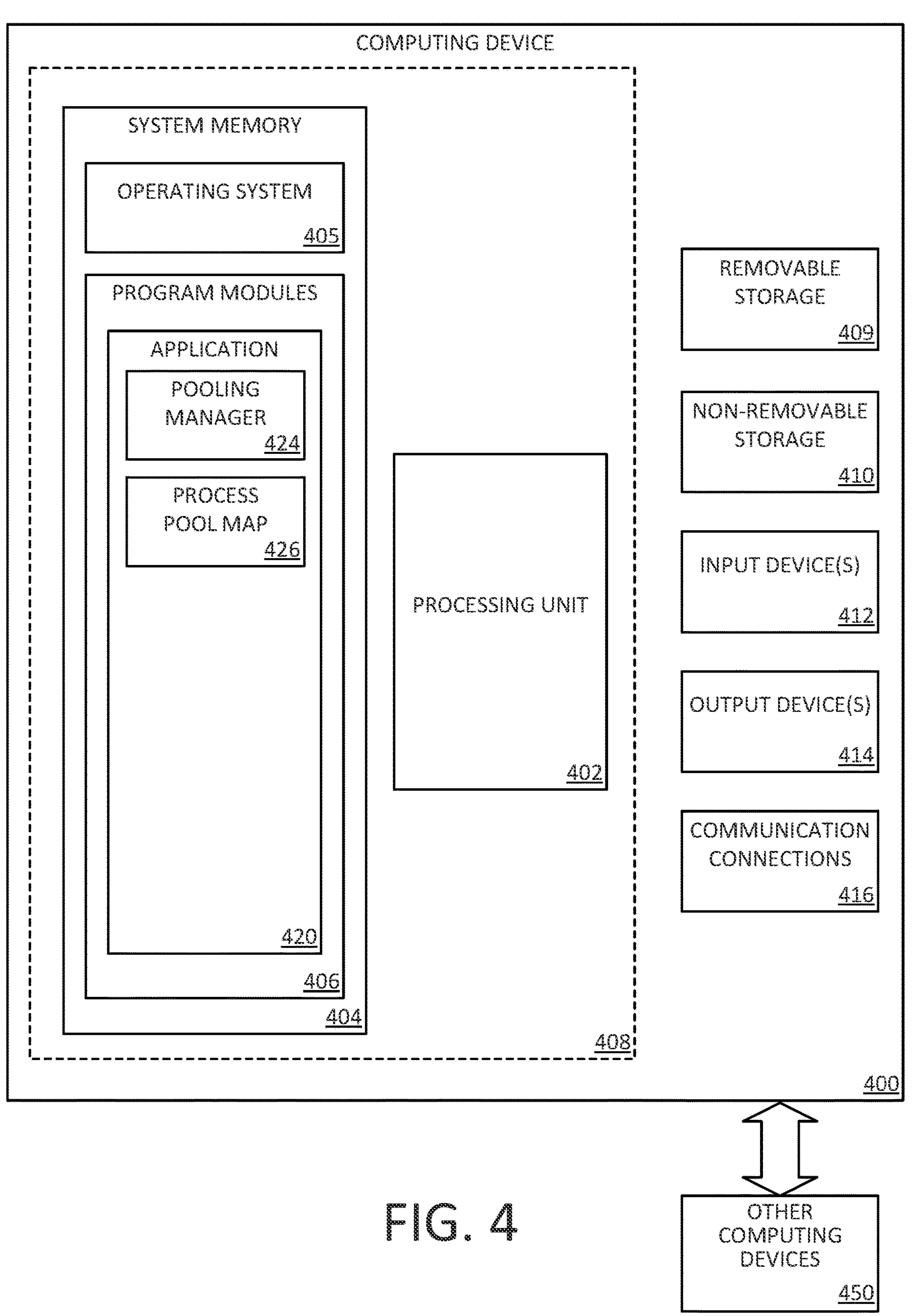
FIG. 4 is a block diagram illustrating example physical components of a computing device with which aspects of the disclosure may be practiced.
Figure 5:
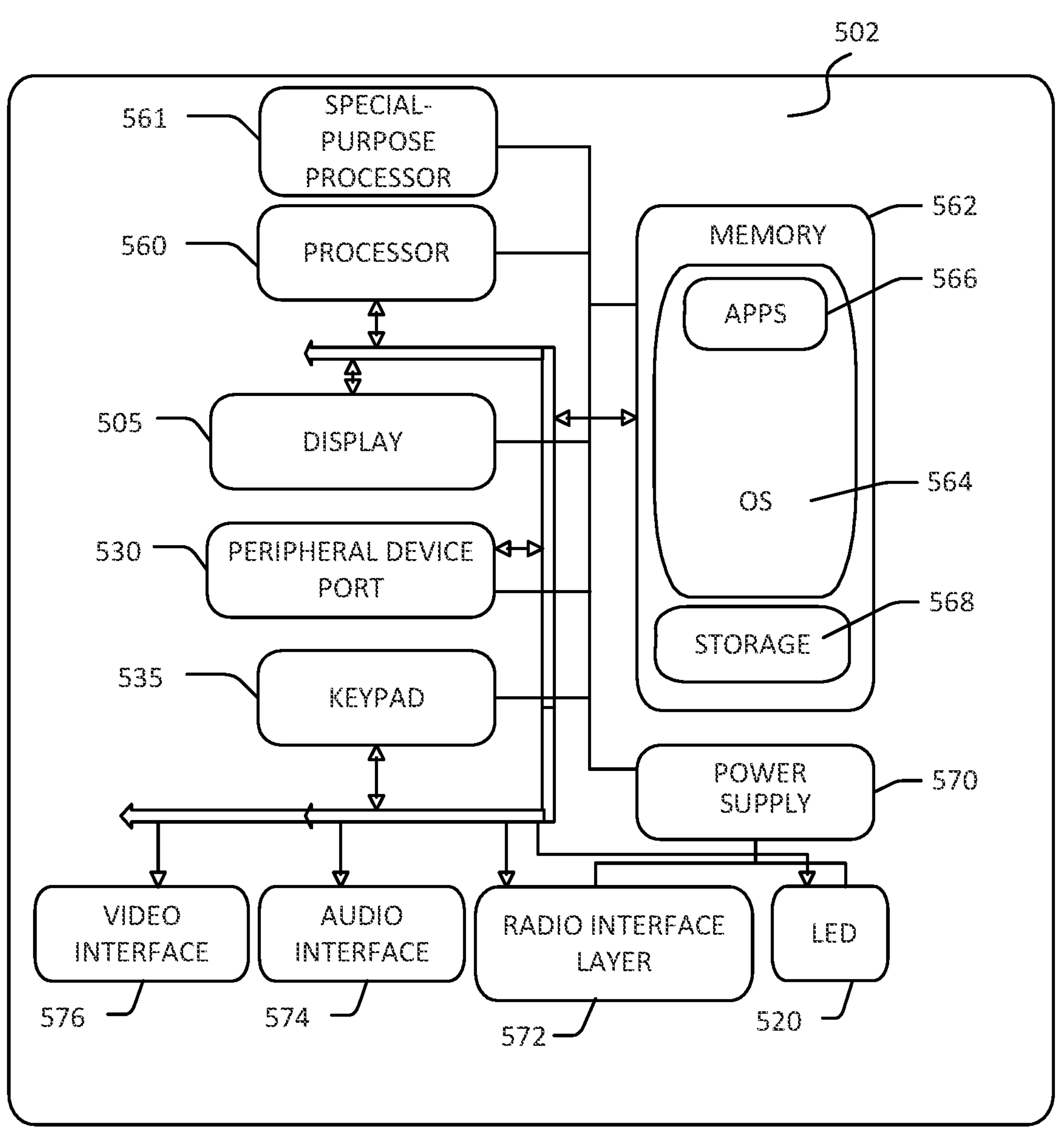
FIG. 5 is a simplified block diagram of a mobile computing device with which aspects of the present disclosure may be practiced.
Figure 6:
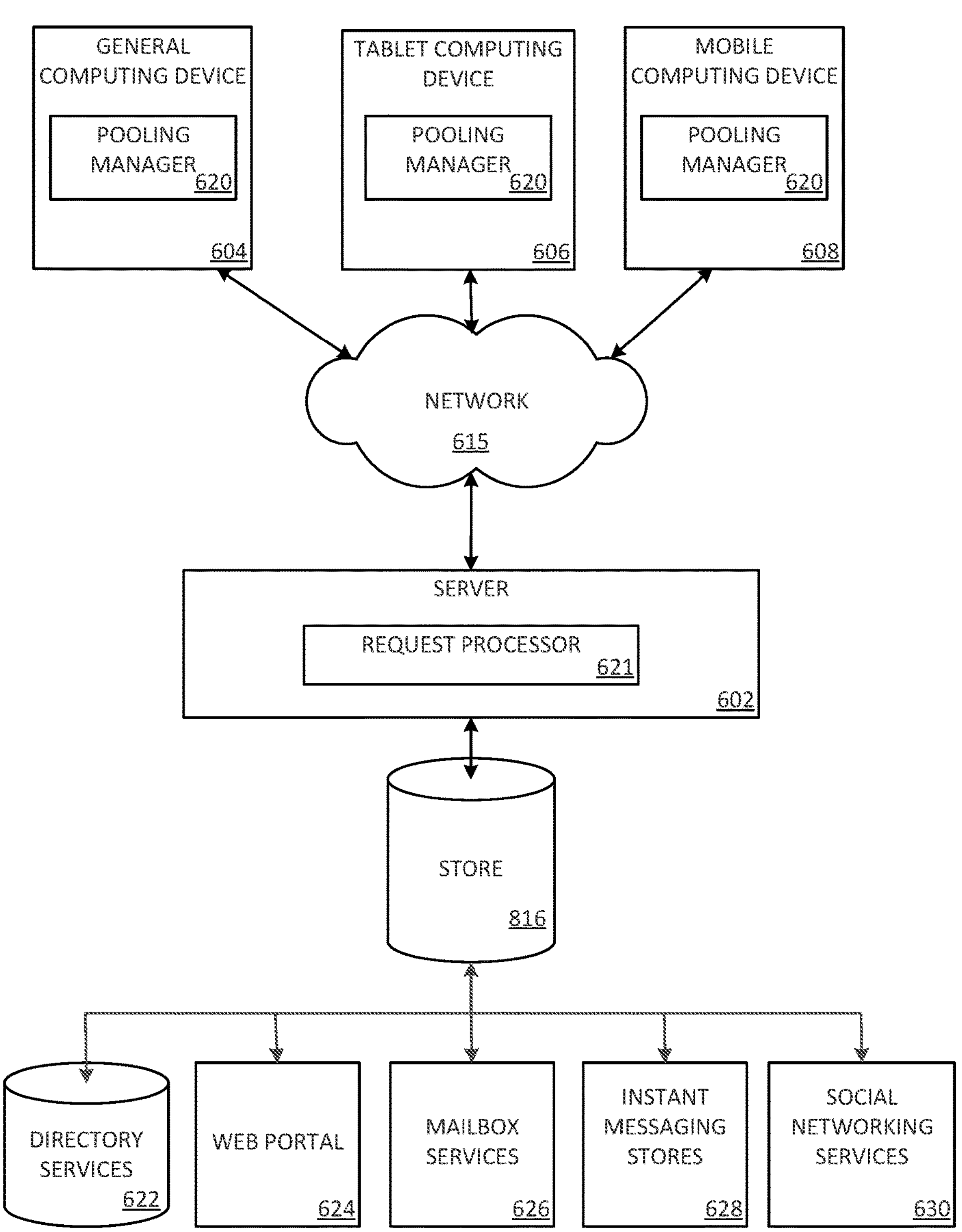
FIG. 6 is a simplified block diagram of a distributed computing system in which aspects of the present disclosure may be practiced.

FIGS. 4-6 and the associated descriptions provide a discussion of a variety of operating environments in which aspects of the disclosure may be practiced. However, the devices and systems illustrated and discussed with respect to FIGS. 4-6 are for purposes of example and illustration and are not limiting of a vast number of computing device configurations that may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices described above, including devices 102 and 104 in FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may store pooling manager 424 and process pool map 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 5 is a block diagram illustrating the architecture of one aspect of a computing device. In examples, the illustrated device is a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 according to aspects described herein.

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5 by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A pooling manager 620 may be employed by a client that communicates with server device 602, and/or request processor 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

It will be appreciated that, as another example, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, from an application, a request for processing by a service; determining, based on a set of criteria associated with the request, whether a process pool includes a utility process with which to host the service; based on determining the process pool does not include a utility process with which to host the service, generating a new utility process for the service based on the set of criteria; and configuring the new utility process to host the service for the application. In an example, configuring the new utility process to host the service comprises establishing an inter-process communication (IPC) channel between the application and the new utility process. In another example, the set of operations further comprises: based on determining the process pool includes a utility process with which to host the service, configuring the utility process of the process pool to host the service for the application. In a further example, the set of operations further comprises: based on determining the process pool includes a utility process with which to host the service, determining whether the utility process can be used to host the service; and based on determining the utility process cannot be used to host the service: generating a new utility process; and configuring the new utility process to host the service for the application. In yet another example, determining whether the utility process can be used to host the service comprises determining whether the utility process has exceeded a resource limit. In a further still example, the set of operations further comprises adding the new utility process to a process pool map that includes an association between the new utility process and a utility process descriptor for the utility process. In another example, determining whether the process pool includes a utility process with which to host the service comprises evaluating the process pool map based on the set of criteria.

In another aspect, the technology relates to a method for process pooling. The method comprises: receiving, from an application, a request for processing by a service; determining, based on the request, a set of criteria for a utility process with which to host the service; identifying, from a process pool and based on the determined set of criteria, a preexisting utility process to host the service; and configuring the identified utility process to host the service for the application. In an example, the set of criteria comprises at least one of: security criteria; privacy criteria; or reliability criteria. In another example, the set of criteria is determined based on at least one of the application or content of the application. In a further example, the application is a web browsing application and the content is a website. In yet another example, the request is a first request that is associated with a first website; the service is a first service; and the method further comprises: receiving a second request for processing by a second service, wherein the second request is associated with a second website; determining, based on a set of criteria associated with the second website, that the process pool does not include a utility process with which to host the second service; and generating a new utility process for the second service based on the set of criteria associated with the second website. In a further still example, the set of criteria associated with the second website indicates a higher security level than the set of criteria associated with the first website.

In a further aspect, the technology relates to another method for process pooling. The method comprises: receiving, from an application, a request for processing by a service; determining, based on a set of criteria associated with the request, whether a process pool includes a utility process with which to host the service; based on determining the process pool does not include a utility process with which to host the service, generating a new utility process for the service based on the set of criteria; and configuring the new utility process to host the service for the application. In an example, configuring the new utility process to host the service comprises establishing an inter-process communication (IPC) channel between the application and the new utility process. In another example, the request is a first request; the service is a first service; and the method further comprises: receiving a second request for processing by a second service; determining, based on a set of criteria associated with the second request, whether the process pool includes a utility process with which to hose the second service; and based on determining the process pool includes a utility process with which to host the second service, configuring the utility process of the process pool to host the second service. In a further example, determining that the process pool does not include a utility process with which to host the service comprises: identifying a utility process of the process pool that matches the set of criteria; and determining the identified utility process cannot be used to host the service. In yet another example, determining the identified utility process cannot be used to host the service comprises determining that the utility process has exceeded a resource limit. In a further still example, the method further comprises adding the new utility process to a process pool map that includes an association between the new utility process and a utility process descriptor for the utility process. In another example, determining whether the process pool includes a utility process with which to host the service comprises evaluating the process pool map based on the set of criteria.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, cause the system to perform a set of operations, the set of operations comprising:

receiving, from an application, a request for processing by a service;

determining, based on a set of criteria associated with the request, whether a process pool of utility processes for hosting services for the application includes a utility process with which to host the service;

based on determining the process pool does not include a utility process with which to host the service, generating a new utility process for the service based on the set of criteria; and configuring the new utility process to host the service for the application, wherein the new utility process is separate from a main process of the application, and wherein the configuring comprises establishing an inter-process communication channel between the application and the new utility process.

2. The system of claim 1, wherein the set of operations further comprises:

based on determining the process pool includes a utility process with which to host the service, configuring the utility process of the process pool to host the service for the application.

3. The system of claim 1, wherein the set of operations further comprises:

based on determining the process pool includes a utility process with which to host the service, determining whether the utility process can be used to host the service; and based on determining the utility process cannot be used to host the service:

generating a second utility process; and configuring the second utility process to host the service for the application.

4. The system of claim 3, wherein determining whether the utility process can be used to host the service comprises determining whether the utility process has exceeded a resource limit.

5. The system of claim 1, wherein the set of operations further comprises adding the new utility process to a process pool map that includes an association between the new utility process and a utility process descriptor for the utility process.

6. The system of claim 5, wherein determining whether the process pool includes a utility process with which to host the service comprises evaluating the process pool map based on the set of criteria.

7. A method for process pooling, the method comprising:

receiving, from an application, a request for processing by a service;

determining, based on the request, a set of criteria for a utility process with which to host the service;

identifying, from a process pool of utility processes for hosting services for the application and based on the determined set of criteria, a preexisting utility process to host the service; and configuring the identified preexisting utility process to host the service for the application, wherein the identified preexisting utility process is separate from a main process of the application, and wherein the configuring comprises establishing an inter-process communication channel between the application and the identified preexisting utility process.

8. The method of claim 7, wherein the set of criteria comprises at least one of:

security criteria;

privacy criteria; or reliability criteria.

9. The method of claim 7, wherein the set of criteria is determined based on at least one of the application or content of the application.

10. The method of claim 9, wherein the application is a web browsing application and the content is a website.

11. The method of claim 10, wherein:

the request is a first request that is associated with a first website;

the service is a first service; and the method further comprises:

receiving a second request for processing by a second service, wherein the second request is associated with a second website;

determining, based on a set of criteria associated with the second website, that the process pool does not include a utility process with which to host the second service; and generating a new utility process for the second service based on the set of criteria associated with the second website.

12. The method of claim 11, wherein the set of criteria associated with the second website indicates a higher security level than the set of criteria associated with the first website.

13. A method for process pooling, the method comprising:

receiving, from an application, a request for processing by a service;

determining, based on a set of criteria associated with the request, whether a process pool of utility processes for hosting services for the application includes a utility process with which to host the service;

based on determining the process pool does not include a utility process with which to host the service, generating a new utility process for the service based on the set of criteria; and configuring the new utility process to host the service for the application, wherein the new utility process is separate from a main process of the application, and wherein the configuring comprises establishing an inter-process communication channel between the application and the new utility process.

14. The method of claim 13, wherein:

the request is a first request;

the service is a first service; and the method further comprises:

receiving a second request for processing by a second service;

determining, based on a set of criteria associated with the second request, whether the process pool includes a utility process with which to host the second service; and based on determining the process pool includes a utility process with which to host the second service, configuring the utility process of the process pool to host the second service.

15. The method of claim 13, wherein determining that the process pool does not include a utility process with which to host the service comprises:

identifying a utility process of the process pool that matches the set of criteria; and determining the identified utility process cannot be used to host the service.

16. The method of claim 15, wherein determining the identified utility process cannot be used to host the service comprises determining that the utility process has exceeded a resource limit.

17. The method of claim 13, further comprising adding the new utility process to a process pool map that includes an association between the new utility process and a utility process descriptor for the utility process.

18. The method of claim 17, wherein determining whether the process pool includes a utility process with which to host the service comprises evaluating the process pool map based on the set of criteria.

* * * * *